United States Patent
Das et al.

(10) Patent No.: US 7,831,599 B2
(45) Date of Patent: *Nov. 9, 2010

(54) ADDITION OF NEW IMAGES TO AN IMAGE DATABASE BY CLUSTERING ACCORDING TO DATE/TIME AND IMAGE CONTENT AND REPRESENTATIVE IMAGE COMPARISON

(75) Inventors: Madirakshi Das, Rochester, NY (US); Alexander C. Loui, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 846 days.

This patent is subject to a terminal disclaimer.

(21) Appl. No.: 11/072,792

(22) Filed: Mar. 4, 2005

(65) Prior Publication Data

US 2006/0200475 A1    Sep. 7, 2006

(51) Int. Cl.
*G06F 7/16* (2006.01)
(52) U.S. Cl. ............................... 707/737; 382/225
(58) Field of Classification Search ................. 707/737; 382/225
See application file for complete search history.

(56) References Cited

U.S. PATENT DOCUMENTS

| | | | | |
|---|---|---|---|---|
| 5,749,077 | A * | 5/1998 | Campbell | 705/36 R |
| 6,081,251 | A * | 6/2000 | Sakai et al. | 345/670 |
| 6,202,073 | B1 * | 3/2001 | Takahashi | 715/204 |
| 6,240,424 | B1 * | 5/2001 | Hirata | 707/104.1 |
| 6,249,316 | B1 * | 6/2001 | Anderson | 348/333.05 |
| 6,272,279 | B1 * | 8/2001 | Yokoyama et al. | 386/52 |
| 6,278,446 | B1 * | 8/2001 | Liou et al. | 715/700 |
| 6,285,995 | B1 * | 9/2001 | Abdel-Mottaleb et al. | 707/3 |
| 6,324,545 | B1 * | 11/2001 | Morag | 707/202 |
| 6,347,313 | B1 * | 2/2002 | Ma et al. | 707/3 |

(Continued)

FOREIGN PATENT DOCUMENTS

WO    WO 01/37131 A2    5/2001

OTHER PUBLICATIONS

Platt, et al., "PhotoTOC: Automatic Clustering for Browsing Personal Photographs," Information, Communications and Signal Processing, 2003 Fourth Pacific Rim Conference on Multimedia. Proceedings of the 2003 Joint Conference for the Fourth International Conference on Singapore. Dec. 15-18, 2003, Piscataway, NJ, USA, IEEE, vol. 1, Dec. 15, 2003.*

(Continued)

*Primary Examiner*—Hung Q Pham
*Assistant Examiner*—Hubert Cheung
(74) *Attorney, Agent, or Firm*—Robert L. Walker; Kevin E. Spaulding (57) ABSTRACT

A database has chronologically ordered images classified into event groups based upon a time difference threshold, and into subgroups based upon a similarity measure. In a method and system for combining new images into such a database, new images are ordered into clusters based upon assessed image features. A representative image is selected in each cluster. A database segment chronologically overlapping the new images is designated and a set of database images similar to each representative image are identified in the segment. Different subgroups including one or more retrieved images are associated with each cluster to provide matched subgroups. The new images are assigned to matched subgroups associated with respective clusters.

16 Claims, 4 Drawing Sheets

U.S. PATENT DOCUMENTS

| | | | |
|---|---|---|---|
| 6,351,556 B1 * | 2/2002 | Loui et al. | 382/164 |
| 6,477,269 B1 | 11/2002 | Brechner | |
| 6,480,840 B2 * | 11/2002 | Zhu et al. | 707/3 |
| 6,606,411 B1 * | 8/2003 | Loui et al. | 382/224 |
| 6,754,675 B2 * | 6/2004 | Abdel-Mottaleb et al. | 707/104.1 |
| 6,865,297 B2 * | 3/2005 | Loui et al. | 382/224 |
| 6,950,989 B2 * | 9/2005 | Rosenzweig et al. | 715/721 |
| 6,993,180 B2 * | 1/2006 | Sun et al. | 382/165 |
| 7,039,239 B2 * | 5/2006 | Loui et al. | 382/225 |
| 7,076,503 B2 * | 7/2006 | Platt et al. | 707/103 R |
| 7,130,864 B2 * | 10/2006 | Lin et al. | 707/104.1 |
| 7,154,513 B2 * | 12/2006 | Nishiyama | 345/667 |
| 7,197,127 B2 * | 3/2007 | Stevens | 379/207.15 |
| 7,242,809 B2 * | 7/2007 | Hunter et al. | 382/224 |
| 7,243,101 B2 * | 7/2007 | Itou | 707/7 |
| 7,313,574 B2 * | 12/2007 | Paalasmaa et al. | 707/104.1 |
| 7,643,686 B2 * | 1/2010 | Kraus et al. | 382/225 |
| 7,653,249 B2 * | 1/2010 | Loui et al. | 382/224 |
| 2002/0183966 A1 * | 12/2002 | Mishra et al. | 702/179 |
| 2002/0188602 A1 * | 12/2002 | Stubler et al. | 707/3 |
| 2003/0009469 A1 * | 1/2003 | Platt et al. | 707/100 |
| 2003/0059107 A1 * | 3/2003 | Sun et al. | 382/165 |
| 2003/0084065 A1 * | 5/2003 | Lin et al. | 707/104.1 |
| 2003/0120642 A1 * | 6/2003 | Egilsson et al. | 707/3 |
| 2003/0147558 A1 * | 8/2003 | Loui et al. | 382/225 |
| 2004/0208377 A1 * | 10/2004 | Loui et al. | 382/224 |
| 2005/0027712 A1 * | 2/2005 | Gargi et al. | 707/100 |
| 2006/0074973 A1 * | 4/2006 | Platt et al. | 707/102 |
| 2006/0104520 A1 * | 5/2006 | Kraus et al. | 382/225 |
| 2006/0126944 A1 * | 6/2006 | Loui et al. | 382/224 |
| 2006/0153460 A1 * | 7/2006 | Kim et al. | 382/225 |
| 2006/0173746 A1 * | 8/2006 | Cooper et al. | 705/26 |

OTHER PUBLICATIONS

John C. Platt et al., "PhotoTOC: Automatic Clustering for Browsing Personal Photographs", Information, Communications and Signal Processing, 2003 and Fourth Pacific RIM Conference on Multimedia. Proceedings of the 2003 Joint Conference of the Fourth International Conference on Singapore Dec. 15-18, 2003, Piscataway, NJ, USA, IEEE, vol. 1, Dec. 15, 2003, pp. 6-10, XP-010702837, ISBN: 0-7803-8185-8.

Alexander C. Loui et al., "Automated Event Clustering and Quality Screening of Consumer Pictures for Digital Albuming", IEEE Transactions on Multimedia, IEEE Service Center, Piscataway, NJ, USA, vol. 5, No. 3, Sep. 2003, pp. 390-402, XP-002374762, ISSN: 1520-9210.

* cited by examiner

ORDERED QUERIES Q    RETRIEVED IMAGES ARRANGED NEWER TO OLDER

FIG. 4

ARRAY A : N*m RETRIEVED IMAGES ARRANGED NEWER TO OLDER

DATA STORED IN EACH CELL

Q(i) : SEQUENCE NUMBER OF QUERY
S(i) : MATCH SCORE WITH Q(i)

L(i,j) ▢▢ • ▢ LIST OF LENGTH j     M(i,j): CUMULATIVE SCORE FOR EACH LIST L(i,j)

FIG. 5

ADDITION OF NEW IMAGES TO AN IMAGE DATABASE BY CLUSTERING ACCORDING TO DATE/TIME AND IMAGE CONTENT AND REPRESENTATIVE IMAGE COMPARISON

FIELD OF THE INVENTION

The invention relates to digital image processing that automatically classifies images and more particularly relates to additive clustering of images lacking individualized capture date-time information.

BACKGROUND OF THE INVENTION

With the widespread use of digital consumer electronic capturing devices such as digital cameras and camera phones, the size of consumers' image collections continue to increase very rapidly. Automated image management and organization is critical for easy access, search, retrieval, and browsing of these large collections.

A method for automatically grouping images into events and sub-events based on date-time information and color similarity between images is described in U.S. Pat. No. 6,606,411 B1, to Loui and Pavie (which is hereby incorporated herein by reference). An event-clustering algorithm uses capture date-time information for determining events. Block-level color histogram similarity is used to determine sub-events. This method has the shortcoming that clustering very large image sets can take a substantial amount of time. It is especially problematic if events and sub-events need to be recomputed each time new images are added to a consumer's image collection, since additions occur a few at a time, but relatively often. Another problem is that consumers need to be able to merge collections of images distributed across multiple personal computers, mobile devices, image appliances, network servers, and online repositories to allow seamless access. Recomputing events and subevents after each merger is inefficient.

The event-clustering algorithm described in U.S. Pat. No. 6,606,411 B1 has the limitation that it uses date-time information from digital camera capture metadata. This is problematic if images to be added to a database lack correct date-time information. Examples of such images include scanned images, digital image CDs from film capture, stills from video camcorders, or images from digital cameras with incorrect date-time settings. In many cases, the images have an associated date-time that relates to origination of a digital file after scanning or other processing, rather than date-time of image capture.

Many methods based on content-based image classification have been proposed for images where no metadata is available. In PCT Patent Application WO 01/37131 A2, published on May 25, 2001, visual properties of salient image regions are used to classify images. In addition to numerical measurements of visual properties, neural networks are used to classify some of the regions using semantic terms such as "sky" and "skin". The region-based characteristics of the images in the collection are indexed to make it easy to find other images matching the characteristics of a given query image. U.S. Pat. No. 6,240,424 B1, issued May 29, 2001, discloses a method for classifying and querying images using primary objects in the image as a clustering center. Images matching a given unclassified image are found by formulating an appropriate query based on the primary objects in the given image. U.S. Pat. No. 6,477,269 B1, issued Nov. 5, 2002, discloses a method that allows users to find similar images based on color or shape by using an example query. It is known to provide image retrieval from image databases using a variety of techniques. U.S. Pat. No. 6,480,840, to Zhu and Mehrotra, issued on Nov. 12, 2002, discloses content-based image retrieval using low-level features such as color, texture and color composition.

These content-based methods have the shortcoming of not considering another type of information commonly available with images, chronological order. Images are commonly stored on media in chronological order. For example, images on a Kodak PictureCD™ derived from film capture are in order of capture. Filenames are often created for images using a numerical sequence or other sequence that results in a chronology. For example, some captured digital images have numerical suffixes in the filename that indicate order of generation.

It would thus be desirable to provide methods and systems, in which new images are additively clustered in a database, without reclustering the entire database.

It is further desirable to provide methods and systems, in which chronological order can be considered in additive clustering.

SUMMARY OF THE INVENTION

The invention is defined by the claims. The invention, in broader aspects, provides a method and system for combining new images into a database having chronologically ordered images classified into event groups based upon a time difference threshold, and into subgroups based upon a similarity measure. In the method and system, new images are ordered into clusters based upon assessed image features. A representative image is selected in each cluster. A database segment chronologically overlapping the new images is designated and a set of database images similar to each representative image are identified in the segment. Different subgroups including one or more retrieved images are associated with each of cluster to provide matched subgroups. The new images are assigned to matched subgroups associated with respective clusters.

It is an advantageous effect of the invention that an improved methods and systems are provided, in which new images are additively clustered in a database, without reclustering the entire database.

It is a further effect of the invention that an improved methods and systems are provided, in which chronological order is maintained in additive clustering, even when capture date/time information is missing.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

In the method, images are additively clustered into preexisting event groups and subgroups of a database of images. The groups are organized on the basis of date-time information. The subgroups of the database are based upon a similarity measure other than date-time information. The term "date-time" is used herein to refer to time information in the form of actual dates and times or elapsed dates and times relative to a common standard.

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

As used herein, the computer program may be stored in a computer readable storage medium, which may comprise, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Figure 2:
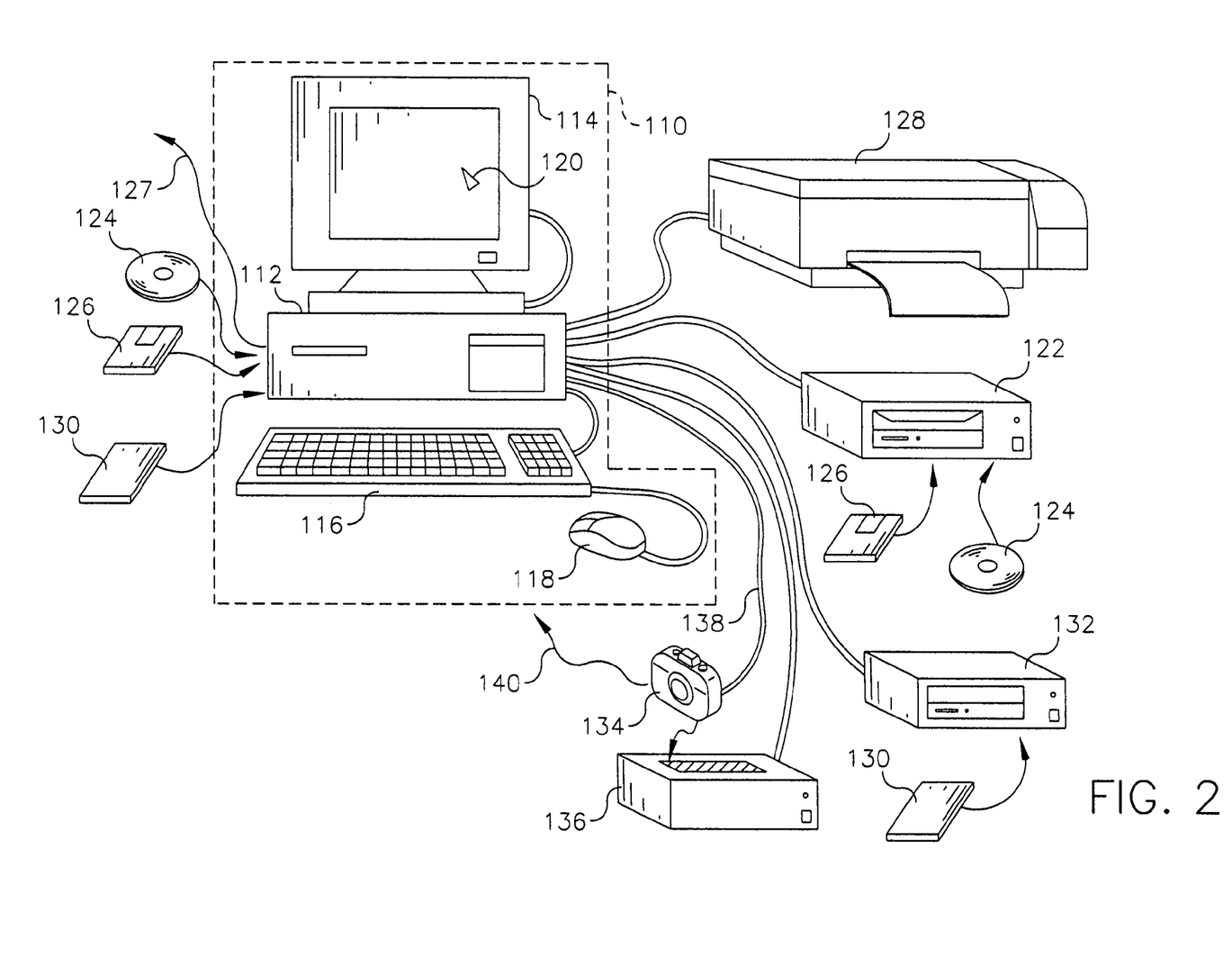
FIG. 2 is a diagrammatical view of an embodiment of the system.

The present invention may be implemented in computer hardware. Referring to FIG. 2, there is illustrated a system for implementing the present invention. Although the computer system is shown for the purpose of illustrating a preferred embodiment, the present invention is not limited to the system shown, but may be used on any electronic processing system such as found in personal computers and other systems for the processing of digital images. Consequently, the computer system will not be discussed in detail herein. The images used herein can be directly input into the computer system (for example by a digital camera) or digitized before input into the computer system (for example by scanning originals, such as silver halide films).

Referring to FIG. 2, the computer system 110 includes a microprocessor-based unit 112 for receiving and processing software programs and for performing other processing functions. A display 114 is electrically connected to the microprocessor-based unit 112 for displaying user-related information associated with the software, e.g., by means of a graphical user interface. A keyboard 116 is also connected to the microprocessor based unit 112 for permitting a user to input information to the software. As an alternative to using the keyboard 116 for input, a mouse 118 may be used for moving a selector 120 on the display 114 and for selecting an item on which the selector 120 overlays, as is well known in the art.

A compact disk-read only memory (CD-ROM) 124, which typically includes software programs, is inserted into the microprocessor based unit for providing a means of inputting the software programs and other information to the microprocessor based unit 112. In addition, a floppy disk 126 may also include a software program, and is inserted into the microprocessor-based unit 112 for inputting the software program. The compact disk-read only memory (CD-ROM) 124 or the floppy disk 126 may alternatively be inserted into externally located disk drive unit 122, which is connected to the microprocessor-based unit 112. Still further, the microprocessor-based unit 112 may be programmed, as is well known in the art, for storing the software program internally. The microprocessor-based unit 112 may also have a network connection 127, such as a telephone line, to an external network, such as a local area network or the Internet. A printer 128 may also be connected to the microprocessor-based unit 112 for printing a hardcopy of the output from the computer system 110.

Images may also be displayed on the display 114 via a personal computer card (PC card) 130, such as, as it was formerly known, a PCMCIA card (based on the specifications of the Personal Computer Memory Card International Association), which contains digitized images electronically embodied in the card 130. The PC card 130 is ultimately inserted into the microprocessor-based unit 112 for permitting visual display of the image on the display 114. Alternatively, the PC card 130 can be inserted into an externally located PC card reader 132 connected to the microprocessor-based unit 112. Images may also be input via the compact disk 124, the floppy disk 126, or the network connection 127. Any images stored in the PC card 130, the floppy disk 126 or the compact disk 124, or input through the network connection 127, may have been obtained from a variety of sources, such as a digital camera (not shown) or a scanner (not shown). Images may also be input directly from a digital camera 134 via a camera docking port 136 connected to the microprocessor-based unit 112 or directly from the digital camera 134 via a cable connection 138 to the microprocessor-based unit 112 or via a wireless connection 140 to the microprocessor-based unit 112.

The output device provides a final image that has been subject to the transformations. The output device can be a printer or other output device that provides a paper or other hard copy final image. The output device can also be an output device that provides the final image as a digital file. The output device can also includes combinations of output, such as a printed image and a digital file on a memory unit, such as a CD or DVD.

The present invention can be used with multiple capture devices that produce digital images. For example, FIG. 2 can represent a system, in which one of the image-capture devices is a conventional photographic film camera for capturing a scene on color negative or reversal film and a film scanner device for scanning the developed image on the film and producing a digital image. Another capture device can be a digital radiography capture unit (not shown) having an electronic imager. The electronic capture unit can have an analog-to-digital converter/amplifier that receives the signal from the electronic imager, amplifies and converts the signal to digital form, and transmits the image signal to the microprocessor-based unit.

The microprocessor-based unit 112 provides the means for processing the digital images to produce pleasing looking images on the intended output device or media. The present invention can be used with a variety of output devices that can include, but are not limited to, a digital photographic printer and soft copy display. The microprocessor-based unit 112 can be used to process digital images to make adjustments for overall brightness, tone-scale, image structure, etc. of digital images in a manner such that a useful image is produced by an image output device. Those skilled in the art will recognize that the present invention is not limited to just these mentioned image processing functions.

The general control computer shown in FIG. 2 can store the present invention as a computer program product having a program stored in a computer readable storage medium, which may include, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM). The associated computer program implementation of the present invention may also be stored on any other physical device or medium employed to store a computer program indicated by offline memory device. Before describing the present invention, it facilitates understanding to note that the present invention is preferably utilized on any well-known computer system, such as a personal computer.

It should also be noted that the present invention can be implemented in a combination of software and/or hardware and is not limited to devices, which are physically connected and/or located within the same physical location. One or more of the devices illustrated in FIG. 2 can be located remotely and can be connected via a network. One or more of the devices can be connected wirelessly, such as by a radio-frequency link, either directly or via a network.

The present invention may be employed in a variety of contexts and environments. Exemplary contexts and environments particularly relevant to combining images from different modalities include, without limitation, medical imaging, remote sensing, and security imaging related to transport of persons and goods. Other exemplary contexts and environments particularly relevant to modalities capturing visible light include, without limitation, wholesale digital photofinishing (which involves exemplary process steps or stages such as film or digital images in, digital processing, prints out), retail digital photofinishing (film or digital images in, digital processing, prints out), home printing (home scanned film or digital images in, digital processing, prints out), desktop software (software that applies algorithms to digital images), other digital fulfillment (such as digital images in—from media or over the web, digital processing, with images out—in digital form on media, digital form over the web, or printed on hard-copy prints), kiosks (digital or scanned input, digital processing, digital or scanned output), mobile devices (e.g., PDA or cell phone that can be used as a processing unit, a display unit, or a unit to give processing instructions), and as a service offered via the World Wide Web.

Figure 1:
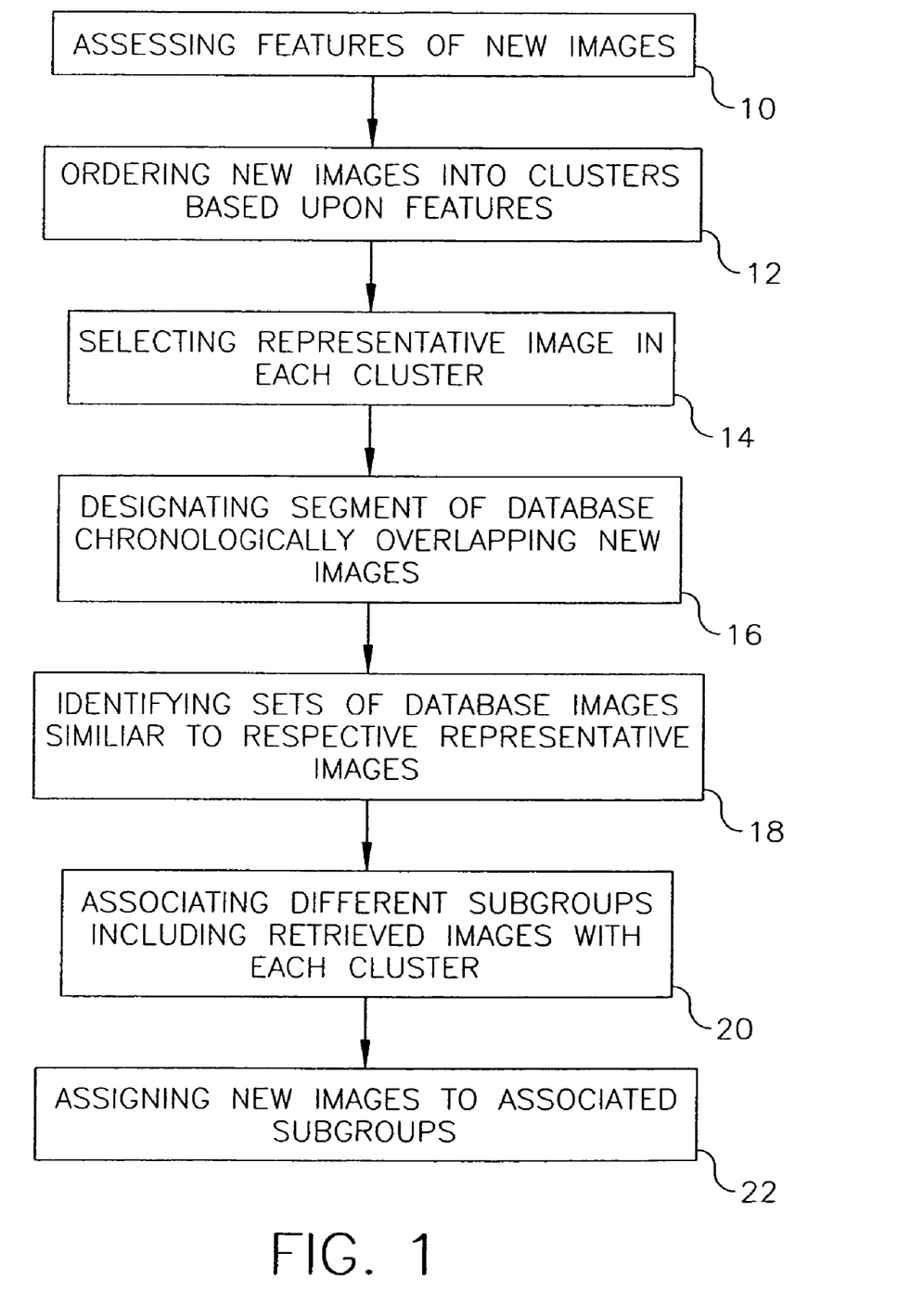
FIG. 1 is a flowchart of an embodiment of the method.

Referring now to FIG. 1, in the method a plurality of new images are combined into an existing database of chronologically ordered images, which are classified into event groups based upon a time difference threshold, and within event groups into event subgroups based upon a similarity measure. Features of the new images are assessed (10) and the new images are ordered or grouped (12) into clusters based upon those features. A representative image is selected (14) in each cluster. A segment of the database chronologically overlapping the new images is designated (16). Sets of one or more retrieved database images similar to each of the representative images are identified by querying (18) the database. Different subgroups including the retrieved images are associated (20) with each cluster and the new images are assigned (22) to associated subgroups.

The manner in which the database has been classified into event groups is not critical and can be automatic using an event-clustering algorithm or manual or a combination of both. The same applies to the classification of event groups into subgroups. Manual classification can be used to determine the time difference threshold heuristically followed by automatic classification using that threshold. In a particular embodiment, the database images have been automatically classified into events and sub-events based on date-time information and color similarity between images as described in U.S. Pat. No. 6,606,411 B1, to Loui and Pavie.

The database supports content-based image retrieval using the same feature or features on which the similarity measure is based. In a particular embodiment, color matching based on histograms computed in each block of images divided into small blocks, as described in U.S. Pat. No. 6,351,556 issued on Feb. 16, 2002 to Loui and Pavie (which is hereby incorporated herein by reference), is used to compute similarity between images. This similarity measure has also been used to determine sub-event boundaries in the automatic event clustering method described in U.S. Pat. No. 6,606,411 B 1, to Loui and Pavie. Alternatively, low-level features such as color, texture and color composition can be used for computing similarity. Color and texture representations and a procedure for similarity-based retrieval is disclosed in U.S. Pat. No. 6,480,840, to Zhu and Mehrotra, issued on Nov. 12, 2002 (which is hereby incorporated herein by reference). In this patent, the dominant colors of an image are determined and each dominant color is described by attribute sets that include color range, moments and distribution within a segment. Texture is described in terms of contrast, scale, and angle. Similarity scores between two images are computed as a weighted combination of the similarity of the underlying features.

The new images, when received, lack capture date-time information or have date-time information that is deemed untrustworthy. The new images can come from one source or multiple sources. For example, the new images can be on a PictureCD obtained by scanning film negatives during photofinishing, image files from scanned prints, or edited digital images, in which capture meta-data has been inadvertently erased. The new images can be from a digital camera that has the date and/or time set incorrectly. This can be determined automatically or manually. For example, date-time information, which indicates a date-time in the future, can be automatically ignored.

Figure 3:
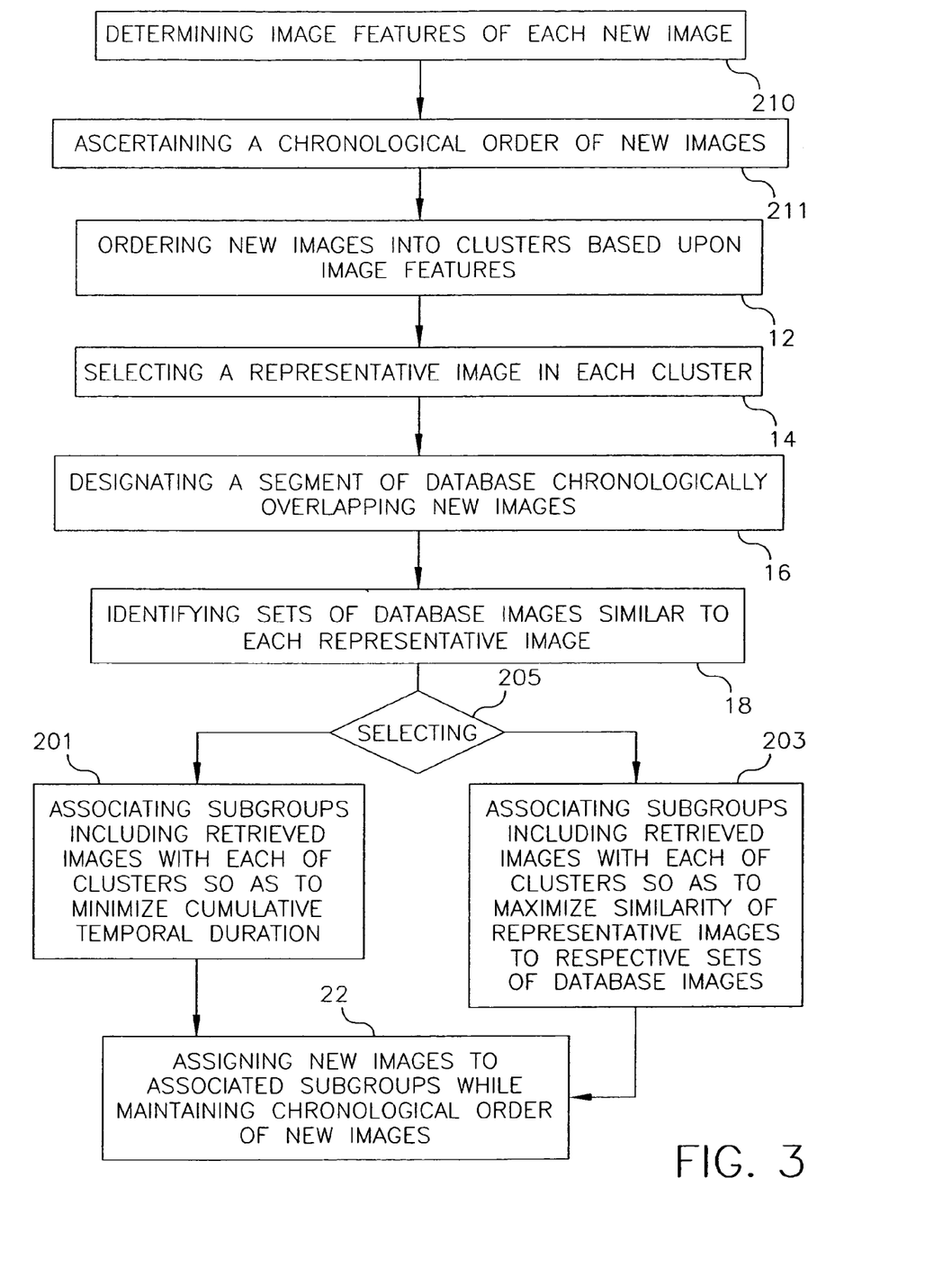
FIG. 3 is a flowchart of another embodiment of the method.

Referring to FIG. 3, the reliability of the method is improved if chronological order information relating to the new images is used. In this case, features of the new images are determined (210), as discussed below, and the chronological order of the new images is ascertained (211). The chronological order of the new images is maintained following entry and classification of the new images into the database. In other words, information about the relative sequence in time of the new images is used and that relative sequence is maintained in the chronology of the database after entry of the new images. (The new images, after inclusion in the database, are likely to be interspersed with earlier incorporated database images. The database, after entry of the new images remains chronologically ordered.)

The chronological order of the new images is first ascertained. This can be done by extracting metadata associated with the new images. For example, automatically-generated dates of file origination can be provided with the new images or the new images may have unique filenames inclusive of metadata defining a relative chronological order. A chronological order can also be ascertained based upon a physical order of images in storage media or by accepting user input designating the order. The ordering of the input images is maintained throughout the addition process.

After the new images are received, one or more image features of each of the new images are determined. The determination can be manual, semi-automatic, or automatic. It is highly preferred that the feature or features used are the same as those upon which the similarity measure is based. In a particular embodiment, the features are block-level color histograms described in U.S. Pat. No. 6,351,556 issued on Feb. 16, 2002 to Loui and Pavie.

The new images are ordered/grouped into clusters based upon the image features. This ordering/grouping can be performed in a variety of different ways, but it is highly preferred that the grouping be on the same basis as the classification of event groups into subgroups in the database. This use of the same classification procedure helps to ensure against the possibility of anomalous classifications, which could result from the use of different classification procedures. In a particular embodiment, the clustering is on the basis of color similarity in neighboring images as described in U.S. Pat. No. 6,351,556 to Loui and Pavie, maintaining the ordering of the images.

A representative image in each of the clusters is selected. The representative image has a high similarity to other images in the cluster and can be selected on the basis of the feature or features used for the grouping of new images. The representative image can have a value of a similarity measure that is at or near an average of the same measure for all of the members of the cluster. Alternatively, the representative image can be the image at the mid-point of the chronologically ordered group. Yet another alternative is manual selection of representative images of each cluster.

A segment of the database is designated that chronologically overlaps the new images. The segment can be the entire database, but is preferably limited to a portion of the database. The temporal length of the segment can be limited based upon any date-time information available that relates to the new images. The new images, in most cases, will have a last date-time, which can be used to exclude from the segment a portion of the database between the new image last date-time and a most recent database image date-time. The last date-time can be a date of creation of scanned digital images from prints or film, the date of receipt of the new images by email, or the last file creation date, for example. The last date-time can also be supplied by a user, for example as a response to an automatically generated question. (The user can supply the last date-time implicitly, for example, by choosing to use the method rather than adding images at the chronological end of the database.)

In the method, the last date-time is no later than the most recent database image date-time. If the last date-time is later, then the method is not used or the new images are culled until a last date-time earlier than the most recent database image date-time can be established. Culling can be done on the basis of user input.

A chronologically ordered segment of the database can include all images earlier than the new image last date-time, but to reduce computational requirements, it is preferred that a beginning date-time of the new images is also ascertained. If the beginning date-time is later than the least recent chronological end of the database, then the segment can then be shortened by limiting the segment to database images having date-times on or between the beginning date-time and the last date-time. The beginning date-time can be ascertained in the same manner as the last date-time.

Figure 4:
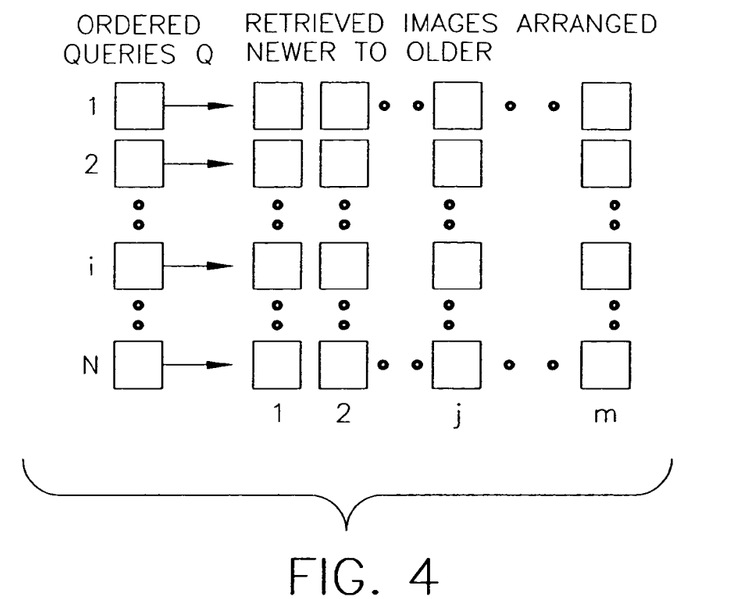
FIG. 4 is a diagram of querying the database in the method of FIG. 3.

A representative image from each cluster is used to query the database for similar images. The ordering of the query images is maintained with most recent first. A set of one or more of the database images similar to each of the representative images are identified in the segment, resulting in a set of one or more retrieved images for each representative image as shown in FIG. 4. The similarity measure used here can be of any kind, and can be the same as that used in the classification of subgroups of the database and the ordering of the clusters. In a particular embodiment, similarity based on block-level color histograms described in U.S. Pat. No. 6,351,556 issued on Feb. 16, 2002 to Loui and Pavie is used.

It is possible for representative images to each match a retrieved image of a different subgroup in the same chronological order as the new clusters, such that association of clusters and subgroups is trivial, but this is unlikely to be the case. In general, the problem of assigning the new clusters to the existing subgroups while maintaining the chronological ordering of the clusters needs to be solved algorithmically to resolve conflicts. It is currently preferred that the algorithm either choose ((201) in FIG. 3) matched subgroups to minimize a cumulative temporal duration of the matched subgroups in the case that the image similarity match score is considered to have low discriminative power, or choose ((203) in FIG. 3) matched subgroups to maximize similarity of the representative images and respective sets of database images when the image similarity match score is considered to have high discriminative power. These alternatives are discussed in detail below.

The decision ((205) in FIG. 3) on the method to be used is based on the distribution of match scores in the top m images for all the representative images combined. Relative similarities of the representative images and respective retrieved images are determined resulting in respective similarity scores. A variance of the similarity scores is assessed using all or a predetermined number of the retrieved images having greater similarity to respective representative images than do the remaining retrieved images. When the variance is less than a predetermined threshold the greedy algorithm approach is used, since the match scores are not discriminative if they are tightly clustered around a mean value. When the variance is the same or greater than the predetermined threshold the other approach is used, because there are significant differences between the level of match for images in the top retrieved sets, and in this case, the optimization step needs to take into account the degree of match in addition to the ordering constraints.

Other alternatives are possible, such as balancing these two goals or providing alternative outputs for the user to decide between.

Referring now to FIG. 4, in a particular embodiment, a greedy algorithm is used in associating retrieved database images with respective new image clusters. A "greedy" algorithm is an algorithm that always selects the best alternative at every given step based on immediate or local information only. The use of the greedy algorithm is based upon an assumption that the match score produced by low-level (color, texture, color composition) features cannot be used for fine discrimination between images; that is, only large differences in the match score are significant.

The sub-events corresponding to the top m images within the database segment, from each of the N retrieved sets are sorted by decreasing time-stamp (most recent first). The value of m is an integer that is preferably between 3 and 20, for example, five. N is the number of new images in a cluster. FIG. 4 shows the set-up of data for the algorithm to process.

The greedy algorithm is used to assign the new groups to existing sub-events ensuring the criterion that more recent sub-events are given a higher priority over older sub-events when assigning the new groups. This algorithm ensures that the shortest start to end time (time starting from the first to the last sub-event where a new group is added) that maintains the ordering of the new images is selected. The greedy algorithm for assigning the new images to existing sub-events is as follows:

Assign images of new cluster corresponding to i to sub-event corresponding to j, if date-time of j is earlier than date-time of sub-event to which images from new cluster (i−1) have been assigned (date-time of i=0 is considered to be the current date-time); and repeat for i=1 to N and for j=1 to m (where j represents the retrieved image groups, in decreasing order of time and where i represents the representative image of the new clusters, starting from the last to first). If j>m (so no assignment was possible), note the number i as unassigned, and continue. Queries that could not be fitted into the segment are assigned to new events inserted adjacent to the nearest neighbor that is part of the solution list.

The second alternative has a dynamic programming algorithm that maximizes the match score, based upon an assumption that the match score is significant, in addition to meeting the ordering constraints.

Figure 5:
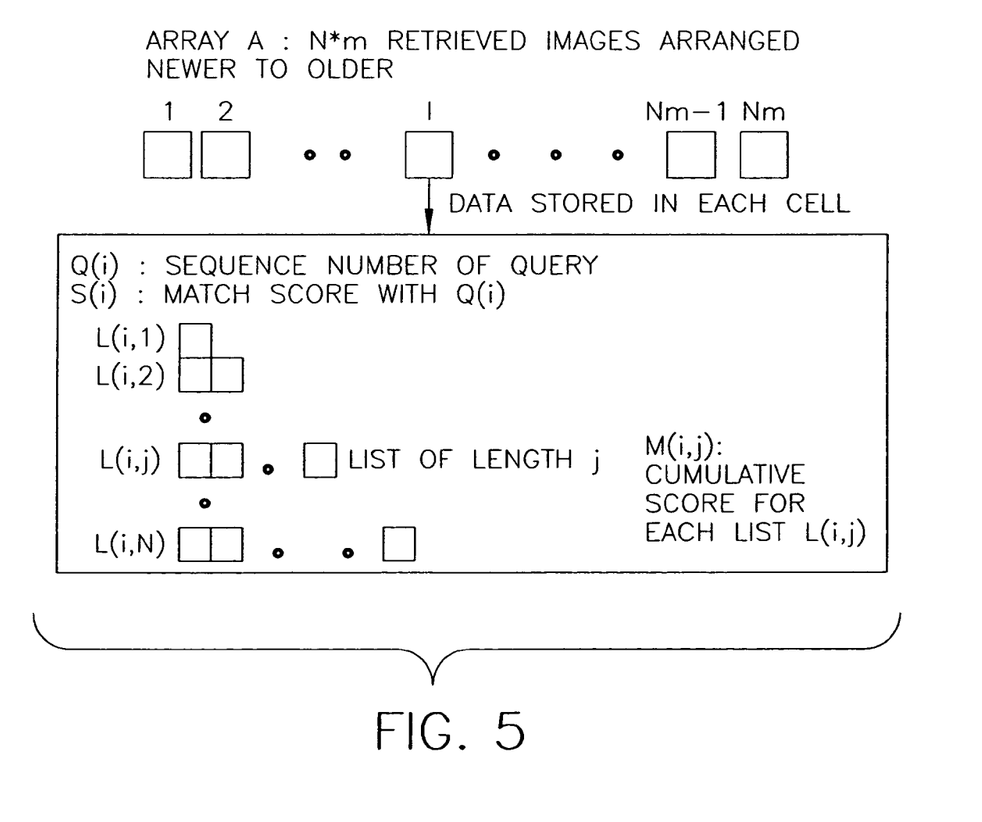
FIG. 5 is a diagram of data structure for a selected one of the subgroup associating algorithms of the method of FIG. 4.

The assignment that maximizes the image similarity score while maintaining the order of the new images is selected using the following algorithm following the dynamic programming paradigm. FIG. 5 shows the data structure for the algorithm.

1. Arrange the top m retrieved images in decreasing order of time creating an array, A, of cells of length Nm as described below. Each cell, i, stores the data:
   a) $Q(i)$: the sequence number of the query image for which this image was retrieved (the term cell label is used for this number). Note that the sequence number maintains the time ordering of the new groups to be inserted, starting with the most recent image.
   b) $S(i)$: the similarity score of $i^{th}$ retrieved image in A with the query image.
   c) $L(i,j)$: lists of length j, where j=1,2, ..., N, containing array indices of A. Let $L_k(i,j)$ represent the $k^{th}$ member of list $L(i,j)$. For a list to be valid, each member must satisfy the criterion $L_k(i,j) > L_{k-1}(i,j)$. Each list $L(i,j)$ gives the best valid selection of retrieved images (one that produces the highest cumulative similarity score) of length j when the first i cells of A are considered. Note that many cells will have less than N lists, since it may not be possible to create larger lists that are valid. The length of the lists is limited by the array location, e.g. at location i (where i<N), the maximum length of the lists can be at most i.
   d) $M(i,j)$: cumulative score for list $L(i,j)$ given by $$\sum_{k=1}^{j} S(L_k(i,j))$$

The goal is to find a set of cells in order with cell labels 1 to N that produces the maximum cumulative match score.

2. Initialize $L(1,1)=1$. Construct each list in order as follows:

if $$Q(i+1) < \min_j Q(L(i,i))$$
$$L(i+1,1) = (i+1); L(i+1,j) = \text{empty where } j > 1$$

(i.e. the first list contains the index of the current array location)

else if $$Q(i+1) > \max_j Q(L(i,j))$$
$$L(i+1,j) = L(i,j) \text{ and } L(i+1,j+1) = L(i,j) + (i+1)$$

(i.e. add a new list to this cell, keeping the other lists the same)

else $L(i+1,j) = L(i,j) - L_j(i,j) + (i+1)$
   if $S(i+1) + M(i,j-1) > M(i,j)$ and
   $Q(i+1) > Q(L_{j-1}(i,j))$
   $= L(i,j)$ otherwise.

(i.e. update list if better score possible with current assignment and it is possible to insert current assignment into earlier list)

3. The longest list generated provides the best assignment of the query images to retrieved images. If there is more than one candidate, the list from the cell with lower index number is the solution (since these assignments are closer to the current time). The new images belonging to the cluster corresponding to query q are assigned to the sub-event corresponding to retrieved image $L_k(i,j)$ where $Q(L_k(i,j))=q$.

4. If the length of the solution list<N, no assignment was found that would fit all the ordering constraints. In this case, queries that could not be fitted into the timeline are assigned to new events inserted adjacent to the nearest neighbor that is part of the solution list.

The invention has been described in detail with particular reference to certain preferred embodiments thereof, but it will be understood that variations and modifications can be effected within the spirit and scope of the invention.

The invention claimed is:

1. A method for combining a plurality of new images into a preexisting database, the method using a processor to perform the steps of:

receiving the plurality of new images;

designating the preexisting database, wherein the designated preexisting database stores chronologically ordered images, wherein the stored chronologically ordered images in the designated preexisting database were previously classified into database event groups based upon a time difference threshold, and wherein images in the database event groups were previously classified into database event subgroups based upon an image similarity measure;

ordering the received plurality of new images into chronological order to form an ordered sequence of new images;

forming new image clusters by analyzing the formed ordered sequence of new images using the image similarity measure to determine image cluster boundaries between consecutive images in the formed ordered sequence of new images;

selecting a representative image in each of the formed new image clusters;

designating a segment of the designated preexisting database, wherein the stored chronologically ordered images in the designated preexisting database chronologically overlaps the received plurality of new images; and assigning each of the formed new image clusters to a corresponding database event group and a corresponding database event subgroup within the designated segment of the designated preexisting database by optimizing a joint match score constrained by the chronological ordering of the received plurality of new images being maintained, wherein the joint match score is responsive to image similarity measures calculated between the selected representative image in each of the formed new image clusters and images in the database event subgroups.

2. The method of claim 1, wherein the ordering of the received plurality of new images includes determining the chronological order based upon metadata associated with the received plurality of new images.

3. The method of claim 2, wherein the metadata associated with the received plurality of new images includes automatically-generated dates of file origination.

4. The method of claim 2, wherein the received plurality of new images have unique filenames inclusive of metadata defining the chronological order and wherein the ordering of the received plurality of new images includes determining the chronological order based upon the unique filenames.

5. The method of claim 1, wherein the ordering of the received plurality of new images includes determining the chronological order based upon a physical order that the received plurality of new images are stored in a storage media.

6. The method of claim 1, wherein the ordering of the received plurality of new images includes accepting user input designating the chronological order.

7. The method of claim 1, wherein the preexisting database defines a most recent database image date-time and the designating of the segment of the designated preexisting database further includes determining a last date-time of the received plurality of new images, wherein the determined last date-time being no later than the defined most recent database image date-time.

8. The method of claim 7, wherein the designating of the segment of the designated preexisting database further includes determining a beginning date-time of the received plurality of new images, and limiting the designated segment of the designated preexisting database to the stored chronologically ordered images on or between the determined beginning date-time and the determined last date-time.

9. The method of claim 8, wherein the determined beginning date-time is determined by accepting user input designating the determined beginning date-time.

10. The method of claim 1, wherein the optimizing the joint match score includes minimizing a cumulative temporal duration of matched database event subgroups.

11. The method of claim 10, wherein a greedy algorithm is used to minimize the cumulative temporal duration of the matched database event subgroups.

12. The method of claim 1, wherein the optimizing of the joint match score includes maximizing the image similarity measures calculated between the selected representative image in each of the formed new image clusters and the images in the database event subgroups.

13. The method of claim 1, wherein the optimizing of the joint match score further comprises:
assessing a variance of the image similarity measures calculated between the selected representative image in each of the formed new clusters and matched images from the database event subgroups;
when the assessed variance is less than a predetermined threshold, assigning the database event subgroups to minimize a cumulative temporal duration of the database event subgroups; and
when the assessed variance is not less than the predetermined threshold, assigning the database event subgroups to maximize the image similarity measures calculated between the selected representative image in each of the formed new image clusters and the images in the database event subgroups.

14. The method of claim 1, wherein the designated segment of the designated preexisting database includes all of the stored chronologically ordered images chronologically earlier than a last date-time of the received plurality of new images.

15. A system for combining a plurality of new images into a preexisting database, the system comprising:
computer readable storage media containing:
the preexisting database, wherein the preexisting database stores chronologically ordered images, wherein the stored chronologically ordered images in the preexisting database were previously classified into database event groups based upon a time difference threshold, and wherein images in the database event groups were previously classified into database event subgroups based upon an image similarity measure; and
a plurality of new images; and
a microprocessor unit communicably connected to the computer readable storage media and configured to:
receive the plurality of new images;
designate the preexisting database;
order the received plurality of new images into chronological order to form an ordered sequence of new images;
form new image clusters by analyzing the formed ordered sequence of new images using the image similarity measure to determine image cluster boundaries between consecutive images in the formed ordered sequence of new images;
select a representative image in each of the formed new image clusters;
designate a segment of the designated preexisting database, wherein the stored chronologically ordered images in the designated preexisting database chronologically overlaps the received plurality of new images; and
assign each of the formed new image clusters to a corresponding database event group and a corresponding database event subgroup within the designated segment of the designated preexisting database by optimizing a joint match score constrained by the chronological ordering of the received plurality of new images being maintained, wherein the joint match score is responsive to image similarity measures calculated between the selected representative image in each of the formed new image clusters and images in the database event subgroups.

16. A computer program product for combining a plurality of new images into a preexisting database, the computer program product comprising a computer readable storage medium storing a computer program executable by a computer for executing a method comprising the steps of:
receiving the plurality of new images;
designating the preexisting database, wherein the designated preexisting database stores chronologically ordered images, wherein the stored chronologically ordered images in the designated preexisting database were previously classified into database event groups based upon a time difference threshold, and wherein images in the database event groups were previously classified into database event subgroups based upon an image similarity measure;

ordering the received plurality of new images into chronological order to form an ordered sequence of new images;

forming new image clusters by analyzing the formed ordered sequence of new images using the image similarity measure to determine image cluster boundaries between consecutive images in the formed ordered sequence of new images;

selecting a representative image in each of the formed new image clusters;

designating a segment of the designated preexisting database, wherein the stored chronologically ordered images in the designated preexisting database chronologically overlaps the received plurality of new images; and assigning each of the formed new image clusters to a corresponding database event group and a corresponding database event subgroup within the designated segment of the designated preexisting database by optimizing a joint match score constrained by the chronological ordering of the received plurality of new images being maintained, wherein the joint match score is responsive to image similarity measures calculated between the selected representative image in each of the formed new image clusters and images in the database event subgroups.

* * * * *